Jan. 25, 1927.
W. G. ORTH ET AL
1,615,291
TAXIMETER
Filed Sept. 9, 1922    2 Sheets-Sheet 1
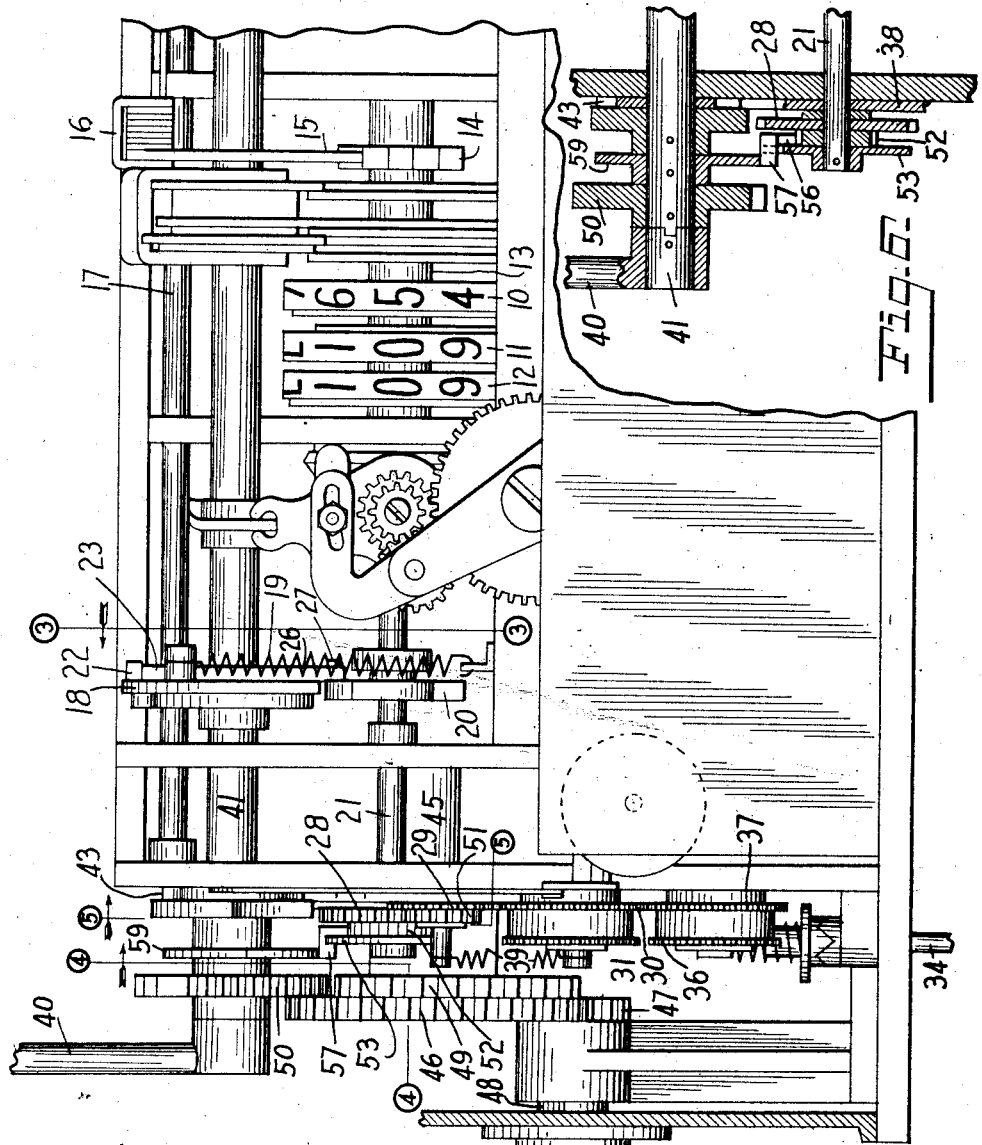
Inventors.
WILLIAM G. ORTH.
GEORGE H. DARST.
By
Attorney Jan. 25, 1927.
W. G. ORTH ET AL
1,615,291
TAXIMETER
Filed Sept. 9, 1922   2 Sheets-Sheet 2
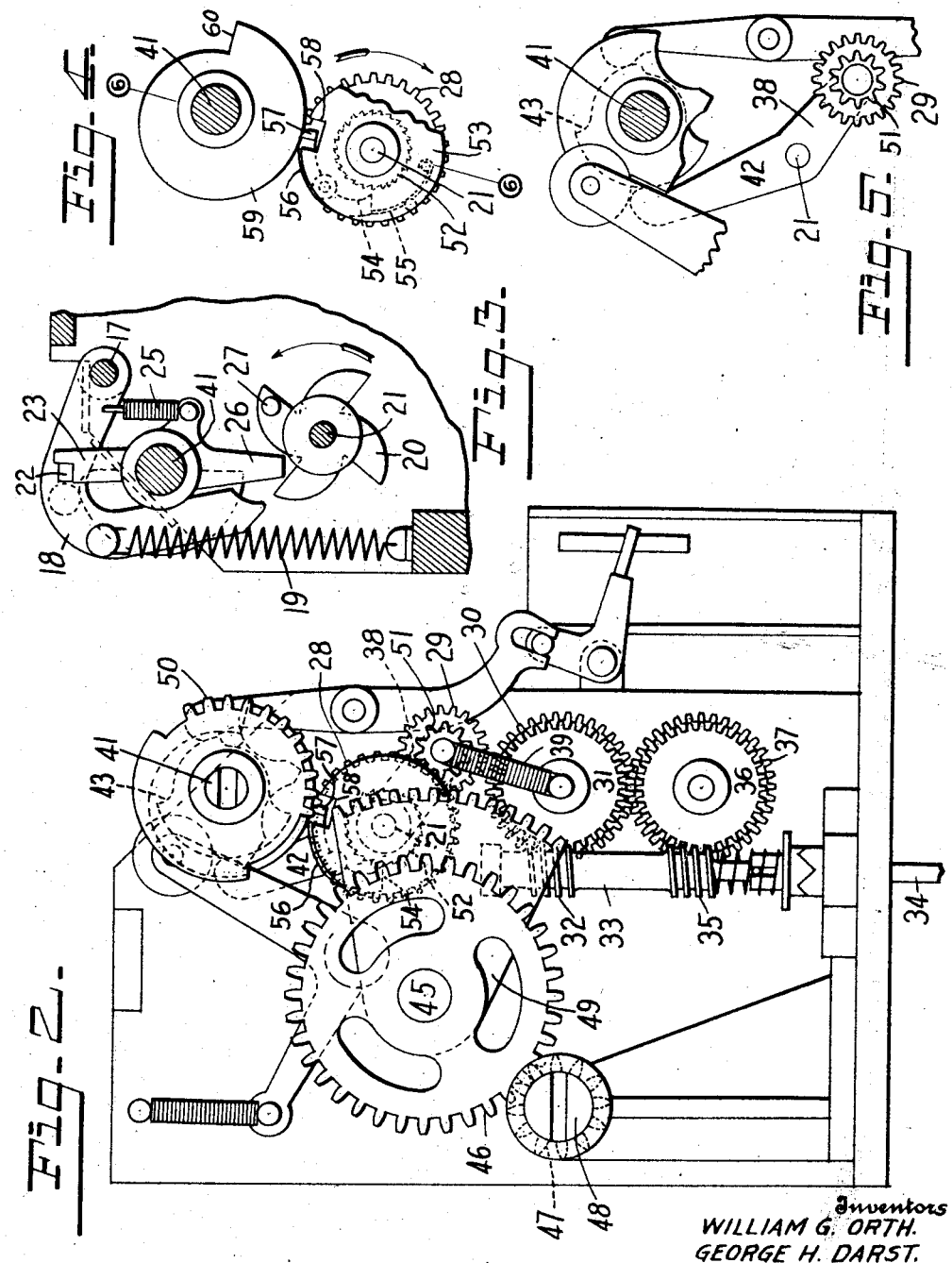
Inventors
WILLIAM G. ORTH.
GEORGE H. DARST.
Attorney Patented Jan. 25, 1927.

1,615,291

UNITED STATES PATENT OFFICE.

WILLIAM G. ORTH AND GEORGE H. DARST, OF DAYTON, OHIO, ASSIGNORS TO OHMER FARE REGISTER COMPANY, OF DAYTON, OHIO, A CORPORATION OF NEW YORK.

TAXIMETER.

Application filed September 9, 1922. Serial No. 587,219.

This invention relates to taximeters and is in the nature of an improvement in the taximeter shown and described in the patent to Ohmer and Bridenbaugh, No. 1,136,164 of April 20 1915.

In that patent the fare counter is operated by an actuating device which may be driven either from a moving part of the vehicle or from a clock. The connection between the moving part of the vehicle and the actuating device comprises a train of gearing, one of the gears of which is permanently connected with the actuating device and is movable into and out of mesh with another gear of the train, to permit the actuating device to be connected with or disconnected from the moving part of the vehicle. This movable gear is controlled by the position of the flag. When the flag is in its normal, or "For hire", position, the movable gear will be out of mesh with the other gear and the movement of the vehicle will not affect the actuating device or the fare counter. When the flag is in its lowered or "Hired" position the movable gear will be in mesh with said other gear and any movement of the vehicle will be transmitted through the actuating device to the fare counter. When the flag is lowered and the movable gear is moved into mesh with said other gear the teeth of the two gears are not always in alinement and the teeth of the movable gear engaging the teeth of the other gear will cause the movable gear to be rotated slightly about its axis, thus shifting the position of the actuating device. The movement imparted to the actuating device is small, but the actuating device advances the fare counter periodically and this small change in the position of the actuating device may result in an operation of the fare counter which would not have taken place if the actuating device had not been shifted by the meshing of the gears.

Such shifting of the actuating device would not immediately result in the operation of the fare counter. If no shifting had occurred it might be that the fare register would indicate 50¢ when the vehicle was discharged, but if a slight shifting had occurred, such a shifting might cause the actuating device to register a fare of 55¢ if the fare registers record multiples of 5¢. It may, therefore, happen that such an initial movement of the actuating device would result in the fare counter indicating a greater fare than the passenger was in reality due to pay.

One object of the invention is to provide means whereby the said gears can be brought into mesh without imparting any movement to the actuating device.

A further object of the invention is to provide means whereby the connection between the movable gear and the actuating device may be interrupted while the movable gear is being moved into mesh with the other gear.

A further object of the invention is to provide an automatically controlled clutch mechanism to connect the actuating device with its driving mechanism.

Another object of the invention is to eliminate the necessity of moving the said gears out of mesh with each other.

Other objects of the invention will appear as the device is described in detail.

In the accompanying drawings Fig. 1 is a front elevation of a portion of a taximeter embodying our invention; Fig. 2 is an end elevation of the same; Fig. 3 is a section taken on the line 3—3 of Fig. 1, looking in the direction of the arrows; Fig. 4 is a section taken on the line 4—4 of Fig. 1, looking in the direction of the arrows; Fig. 5 is a section taken on the line 5—5 of Fig. 1, looking in the direction of the arrows; and Fig. 6 is a sectional view taken on the line 6—6 of Fig. 4.

In these drawings we have illustrated one embodiment of our invention and have shown the same as applied to a taximeter, the main features of which conform substantially to what is shown in the above mentioned patent, but it will be understood that the invention may be used in taximeters, or the like, of various kinds and that it may take various forms without departing from the spirit thereof.

In these drawings we have illustrated and will now describe only so much of the taximeter mechanism as is necessary to an understanding of the present invention. As here shown, the taximeter comprises a fare registering device which, in the present instance, is in the form of a rotatable fare counter. The tens of cents counter is shown at 10 while the units of dollars counter is shown at 11, and the tens of dollars counter is shown at 12. These counters are in the form of wheels, or drums, rotatably mounted upon a counter shaft 13, which also constitutes a resetting shaft, as will hereinafter appear. The units of cents counter wheel is not used because in the present machine the fare is registered in units of ten cents and the final figure is always a cipher and is, therefore, placed upon a fixed part of the mechanism, not shown, in a position in which it will aline with the indications on the fare counter wheels. The tens of cents counter 10 is operatively connected with a ratchet wheel 14 and the count is transferred from the counter 10 to the counter 11 and from the counter 11 to the counter 12 by transfer mechanism of any suitable character. The ratchet wheel 14 is actuated by a pawl 15 carried by an arm 16 rigidly secured to a shaft 17 extending lengthwise of the machine and this shaft is rocked about its longitudinal axis to cause the pawl 15 to periodically engage the ratchet wheel and advance the fare counter. An arm 18 is rigidly secured to the shaft 17 and is acted upon by a spring 19 which serves to move the shaft in a direction to cause the pawl 15 to rotate the ratchet wheel 14. The arm 18 is moved in the opposite direction, against the tension of the spring 19, by a suitable actuating device, which is here shown as a cam 20 mounted on a cam shaft 21 and arranged to engage the end of the arm 18 to raise the same against the tension of the spring 19 and then release the arm to permit it to be moved downwardly by the spring 19. In the present construction the actuating cam is a four leaf cam and the pawl will be actuated four times for each complete rotation of the shaft 21 and each operation of the pawl will add ten cents to the fare counter.

When the taximeter is placed in service, that is, when the flag is lowered, to indicate that the vehicle has been hired, the fare counter will indicate a certain minimum fare which is due regardless of the distance traveled by the machine. This minimum fare may, in the present instance, be assumed to be twenty cents. It is, therefore, desirable that the actuating mechanism for the fare counter should remain inoperative until the distance traveled, or the waiting time, has equaled the minimum fare, after which the actuating mechanism should become operative. In the present machine, this is accomplished by providing the arm 18 with a stud 22 which is engaged by a detent 23 pivotally mounted on the shaft 41 and acted upon by a spring 25 which serves to move it into the path of the projection 22 when the arm 18 is in its elevated position. The arm 18 is elevated when the fare counter and actuating cam are returned to their normal positions at the end of each trip, as will be hereinafter explained, and the detent 23 then engages the projection, or stud, 22 and locks the arm in its elevated position. A trip arm 26 is connected with the detent 23 and arranged in the path of a pin 27 carried by the cam 20. This pin is so arranged on the cam that when the latter is in its initial position it will be spaced such a distance from the trip arm that it will not engage and operate that arm until the cam has been rotated, either by the vehicle or by the clock, a certain specified distance. When this movement of the cam has been completed the pin will actuate the trip arm and move the detent out of engagement with the projection 22, thereby releasing the arm 18 and allowing it to move into operative engagement with the cam.

The actuating device, or cam, 20 may be rotated either from the moving part of the vehicle or from a clock mechanism, but inasmuch as the present invention has no relation, in the present mechanism, to the clock drive it is not necessary to describe this part of the mechanism. The shaft 21 on which the cam 20 is mounted is operatively connected with a moving part of the vehicle, such as one of the wheels, and as here shown, the shaft 21 has loosely mounted thereon a gear 28 with which meshes a pinion 51 having secured thereto a pinion 29, which pinion is adapted to mesh with a gear 30 having connected therewith a worm gear 31 with which meshes a worm 32 on a worm shaft 33, the worm shaft being connected at 34 preferably by means of a flexible shaft, with the moving part of the vehicle. The worm shaft 33 has, in the present instance, a second worm 35 which actuates a second worm wheel 36 with which is connected a gear 37 meshing with the gear 30, the gears being connected with the worm wheels by overrunning clutches, not here shown, so that either worm wheel can be rotated independently of the other, the arrangement being such that the actuating device for the fare counter will be rotated in the same direction regardless of the direction in which the vehicle is moving.

The pinion 29 is movable into and out of mesh with the gear 30, to permit the actuating cam to be connected with, or disconnected from, the driving mechanism. As here shown, the pinion 51 and gear 29 are carried by an arm 38 mounted about the axis of the shaft 21 and acted upon by a spring 39 which tends to move the pinion 29 into engagement with the gear 30. The movement of the gear 29 into and out of mesh with the gear 30 is controlled by the position of the flag which is here shown at 40 and is mounted upon a flag shaft 41. To this end, an arm 42 is rigidly connected with the arm 38 which carries the pinion 29 and is arranged in the path of a cam 43 mounted on the flag shaft 41, the arrangement of the cam being such that when the flag is in its normal or "For hire" position the pinion will be in its inoperative position and when the flag is lowered to its "Hired" position the pinion 29 will be released from the cam 43 so that it can be moved by the spring 39 into mesh with the gear 30.

If desired the cam 43, arm 42, and arm 38 may be omitted, and the pinions 29 and 51 may be mounted on a fixed shaft so that the pinion 29 will always mesh with the gear 30.

At the end of each trip the fare counter, actuating cam, and associated parts, including the flag, are returned to their initial positions. This may be accomplished in any suitable way but the present machine contains printing mechanism substantially identical with that shown in the aforementioned patent to Ohmer and Bridenbaugh. As shown in Fig. 2 the printing shaft 45 has mounted thereon a gear 46 which meshes with a pinion 47 on a stud shaft 48 adapted to receive a crank, or other suitable device for rotating the same. The movement of this printing shaft is transmitted through mechanism not here shown to the counter shaft 13 and this shaft has connected therewith suitable parts cooperating with the fare counters and with the actuating cam 20 for restoring the same to their initial positions, but as this mechanism forms no part of the present invention and is fully shown and described in the said patent to Ohmer and Bridenbaugh it need not be here described or illustrated. Connected with the shaft 45 is a toothed segment 49 which engages a mutilated gear 50 on the flag shaft 41 and thus rotates that shaft in a direction to elevate the flag and restore the same to its normal or "For hire" position. The flag is lowered independently of the printing mechanism and it will be obvious that it could be restored in the same manner so far as the present invention is concerned.

As has been above explained, if the teeth of the pinion 29 are not in exact registration with the teeth of the gear 30 the movement of the pinion into mesh with the gear will cause the former to be slightly rotated and this movement will be imparted to the actuating cam. To prevent this movement of the actuating cam we have provided means, which is preferably controlled by the position of the flag, for disconnecting the pinion 29 from the actuating cam during the movement of the pinion into mesh with the gear 30. Preferably a clutch is interposed between the pinion and the actuating cam and this clutch is shifted when the flag is moved from one position to another. In the present construction the pinion 29 is permanently in mesh with the gear 28 which is loosely mounted on the shaft 21 and has connected therewith a ratchet wheel 52. Rigidly secured to the shaft 21 adjacent to the gear 28 is a disk 53 on which is pivotally mounted a pawl 54 which is acted upon by a spring 55 which tends to move it into engagement with the ratchet wheel 52 so that the movement of the ratchet wheel will be transmitted to the shaft but the shaft may rotate forwardly relatively to the ratchet wheel so as not to interfere with the resetting of the actuating cam to its initial position. The pawl 54 has an end portion, or tail, 56 provided with a laterally extending finger 57 which extends through a notch 58 in the disk 53 and lies in the path of a cam 59 mounted on the flag shaft 41. This cam is of such a shape and is so arranged that when the flag is in its elevated, or "For hire" position, and the actuating cam is in its initial position the cam will engage the finger 57 of the pawl and hold the pawl out of engagement with the ratchet wheel, thus disconnecting the pinion 29 from the shaft 21. When the flag is lowered the nose 60 of the cam will be moved past the initial, or home, position of the finger 57 and will thus release the pawl and permit the same to engage the ratchet wheel, thus establishing the operative connection between the pinion 29 and the actuating cam. It will be understood that the parts are in their home positions, as shown in Fig. 4, when the flag is in the "For hire" position. The movements of the parts are so timed that as the flag is lowered the pinion 29 will be moved into mesh with the gear 30 before the nose 60 of the cam 59 has cleared the finger 57 of the pawl. Consequently, the pinion is disconnected from the actuating device when it is brought into mesh with the gear and any movement that may be imparted to the pinion will not be transmitted to the actuating cam 20. The further movement of the flag will carry the nose of the cam past the finger 57 and permit the pawl to engage the ratchet wheel. When the mechanism is reset to zero the cam 59 will be moved past the initial, or home, position of the pawl finger 57 before the resetting of the actuating cam has been completed and, consequently, when this resetting movement has been completed and the finger of the pawl brought to its initial position the finger will engage the periphery of the cam and the pawl will be moved out of engagement with the ratchet wheel, thereby again interrupting the connection between the gear train and the actuating cam.

In the present machine we have preferred to utilize the invention in connection with a gear train in which one of the gears, that is, the pinion 29, is movable into and out of mesh with another gear of the train, for the purpose of establishing and interrupting the connection between the driving mechanism and the actuating cam, but it will be obvious that, if desired, the flag controlled clutch mechanism which is interposed between the gear 28 and the actuating cam may be utilized with a gear train, or other actuating mechanism, having no movable part corresponding to the gear 29, as the movement of the clutch member, or pawl, 54 will disconnect the driving mechanism from the actuating cam when the flag is in its "For hire" position and will cause that connection to be reestablished when the flag is moved to its "Hired" position.

While we have shown and described one embodiment of our invention we wish it to be understood that we do not desire to be limited to the details thereof as various modifications may occur to a person skilled in the art.

Having now fully described our invention what we claim as new and desire to secure by Letters Patent, is:

1. In a taximeter, a fare counter, an actuating device therefore, means for imparting movement to said actuating device, said means comprising a gear train, one gear of which is movable into and out of mesh with another gear thereof, and means to interrupt the connection between said gear train and said actuating device while said movable gear is being moved into mesh with said other gear.

2. In a taximeter, a fare counter, an actuating device therefor, means for imparting movement to said actuating device, said means comprising a gear train, one gear of which is movable into and out of mesh with another gear thereof, resetting mechanism and means controlled by said resetting mechanism to interrupt the connection between said gear train and said actuating device while said movable gear is being moved into mesh with said other gear.

3. In a taximeter, a fare counter, an actuating device therefor, means for imparting movement to said actuating device, said means comprising a gear train, one gear of which is movable into and out of mesh with another gear thereof, means to interrupt the connection between said gear train and said actuating device while said movable gear is being moved into mesh with said other gear, and a flag, the position of which controls the position of said movable gear and the connection between said gear train and said actuating device.

4. In a taximeter, a fare counter, an actuating device therefor, a gear adapted to be connected with and disconnected from said actuating device, a driving gear, a gear connected with the first mentioned gear and movable into and out of mesh with said driving gear and means to disconnect said first mentioned gear from said actuating device while said movable gear is being moved into mesh with said driving gear.

5. In a taximeter, a fare counter, an actuating device therefor, a gear adapted to be connected with and disconnected from said actuating device, a driving gear, a gear connected with the first mentioned gear and movable into and out of mesh with said driving gear, and means controlled by the normal operation of said taximeter to disconnect said first mentioned gear from said actuating gear while said movable gear is being moved into mesh with said driving gear.

6. In a taximeter, a fare counter, an actuating device therefor, a gear, a clutch connection between said gear and said actuating device, a driving gear, a gear connected with the first mentioned gear and movable into and out of mesh with said driving gear, and means controlled by the normal operation of said taximeter to shift said clutch connection and disconnect the first mentioned gear from said actuating device while the movable gear is being moved into mesh with said driving gear.

7. In a taximeter, a fare counter, an actuating device therefor, a gear, a clutch connection between said gear and said actuating device, a driving gear, a gear connected with the first mentioned gear and movable into and out of mesh with said driving gear, a flag movable from one position to another, resetting mechanism to restore said flag to its initial position, means controlled by said resetting mechanism to shift said clutch and disconnect said first mentioned gear from said actuating device, and means actuated by one movement of said flag to first move said movable gear into mesh with said driving gear and then shift said clutch to establish the connection between the first mentioned gear and said actuating device.

8. In a taximeter, a fare counter, an actuating device therefor, driving mechanism for said actuating device comprising a gear, a ratchet wheel connected with said gear, a member connected with said actuating device, a pawl carried by said member, adapted to engage said ratchet wheel, a flag movable from one position to another, and means controlled by the position of said flag to shift said pawl.

9. In a taximeter, a fare counter, an actuating device therefor, driving mechanism for said actuating device comprising a gear normally disconnected from said actuating device, a pawl and ratchet connection between said gear and said actuating device, a cam to control the position of said pawl with relation to its ratchet wheel, and means for rotating said cam.

10. In a taximeter, a fare counter, a shaft, an actuating device carried by said shaft, a gear rotatably mounted on said shaft, a ratchet wheel connected with said gear, a pawl carrier rigidly secured to said shaft, a pawl carried by said carrier and adapted to engage said ratchet wheel, a flag movable from one position to another, and a cam movable with said flag and adapted to control the position of said pawl.

11. In a taximeter, a fare counter, a shaft, an actuating device carried by said shaft, a gear rotatably mounted on said shaft, a ratchet wheel connected with said gear, a pawl carrier rigidly secured to said shaft, a pawl carried by said carrier and adapted to engage said ratchet wheel, a flag shaft, a flag carried by said flag shaft, and a cam secured to said flag shaft and arranged to control the position of said pawl.

12. In a taximeter, a fare counter, a shaft, an actuating device carried by said shaft, a gear rotatably mounted on said shaft, a ratchet wheel connected with said gear, a pawl carrier rigidly secured to said shaft, a pawl carried by said carrier and adapted to engage said ratchet wheel, said pawl having a tail provided with a lateral extension, a flag shaft, a flag carried by said shaft, and a cam secured to said shaft and arranged to engage the projection on the tail of said pawl and to control the position of said pawl.

13. In a taximeter, a fare counter, a shaft, an actuating device carried by said shaft, a gear rotatably mounted on said shaft, a ratchet wheel connected with said gear, a pawl carrier rigidly secured to said shaft, a pawl carried by said carrier and adapted to engage said ratchet wheel, said pawl having a tail provided with a lateral extension, a flag shaft, a flag carried by said shaft, and a cam secured to said shaft and arranged to engage the projection on the tail of said pawl and release said pawl when said flag is in one position, and means for moving said cam into a position to engage said projection and then restoring said actuating device and said pawl carrier to their initial positions.

14. In a mechanism of the character described, a counter actuating device, driving mechanism therefor, a clutch comprising two members movable relatively one to the other about a common axis and connected respectively with said counter actuating device and said driving mechanism, and a part movable into and out of position to connect said members for rotation in unison, a flag movable from one position to another, and means controlled by the position of said flag to control the position of said movable part.

15. In a mechainsm of the character described, a counter actuating device, driving mechanism therefor, a clutch comprising two members movable relatively one to the other about a common axis and connected respectively with said counter actuating device and said driving mechanism, a part movable into and out of position to connect said members for rotation in unison, a flag movable from one position to another, and a cam connected with said flag and acting on said movable part to control the position thereof.

16. In a mechanism of the character described, a counter actuating device, driving mechanism therefor, a clutch comprising two members movable relatively one to the other about a common axis and connected respectively with said counter actuating device and said driving mechanism, a part movable into and out of position to connect said members for rotation in unison, a second part operatively connected with the first mentioned part, a flag movable from one position to another, and a cam connected with said flag for actuating said second part.

In testimony whereof, we affix our signatures hereto.

WILLIAM G. ORTH.
GEORGE H. DARST.